United States Patent
Tadanobu et al.

(10) Patent No.: US 6,343,005 B1
(45) Date of Patent: Jan. 29, 2002

(54) SOLID ELECTROLYTIC CAPACITORS AND METHOD FOR MANUFACTURING THE SAME

(75) Inventors: Kazuo Tadanobu, Kyoto; Yasuhiro Kobatake, Osaka; Takuhisa Sugimoto; Masato Ozawa, both of Kyoto; Tomoko Hosokawa, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/768,008

(22) Filed: Jan. 24, 2001

(30) Foreign Application Priority Data

Jan. 28, 2000 (JP) ............................................. 12-019815

(51) Int. Cl.$^7$ .................................................. H01G 9/04

(52) U.S. Cl. ...................... 361/532; 361/504; 361/510; 361/525; 361/508

(58) Field of Search ................................. 361/532, 503, 361/510, 527, 528, 538, 508, 505, 509, 564

(56) References Cited

U.S. PATENT DOCUMENTS

| | | | |
|---|---|---|---|
| 5,005,107 A | * 4/1991 | Kobashi et al. ............. | 361/540 |
| 5,621,608 A | * 4/1997 | Arai et al. .................. | 361/525 |
| 5,729,428 A | * 3/1998 | Sakata et al. ............... | 361/523 |
| 5,748,271 A | * 5/1998 | Hikmet et al. ................ | 349/69 |
| 5,781,401 A | * 7/1998 | Tomiyasu et al. ........... | 361/303 |
| 6,154,358 A | * 11/2000 | Fukaumi et al. ............ | 361/523 |
| 6,162,563 A | * 12/2000 | Miura et al. ................. | 429/309 |
| 6,229,689 B1 | * 5/2001 | Kobayashi et al. ......... | 361/525 |

* cited by examiner

Primary Examiner—Anthony Dinkins
Assistant Examiner—Nguyen Ha
(74) Attorney, Agent, or Firm—McDermott, Will & Emery

(57) ABSTRACT

A solid electrolytic capacitor of the present invention includes a positive electrode body, a dielectric layer disposed on the surface of the positive electrode body, a solid electrolyte layer disposed on the surface of the dielectric layer, a negative electrode layer disposed on the surface of the solid electrolyte layer, a positive electrode terminal electrically connected to the positive electrode body, and a negative electrode terminal electrically connected to the negative electrode layer, wherein the negative electrode layer includes a carbon layer and a conductor layer, and the carbon layer contains carbon particles and a benzene compound shown by the chemical formula 1. The whole is covered with facing resin while exposing the positive electrode terminal led out of the positive electrode body and the negative electrode terminal led out of the negative electrode layer. With this configuration, the carbon layer formed is fine and uniform. Accordingly, the contact resistance between the solid electrolyte layer and the carbon layer is reduced, and the contact resistance between the carbon layer and the conductor layer. As a result, it is possible to obtain a solid electrolytic capacitor assuring excellent equivalent series resistance characteristic and capacity utilization factor.

Chemical formula 1 where each of R1, R2, R3, and R4 has H, OH group, COOH group, or alkyl group

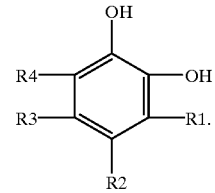

13 Claims, 3 Drawing Sheets

SOLID ELECTROLYTIC CAPACITORS AND METHOD FOR MANUFACTURING THE SAME

FIELD OF THE INVENTION

The present invention relates to solid electrolytic capacitors using solid electrolyte and a method for manufacturing the same.

BACKGROUND OF THE INVENTION

Due to the remarkable development of digital equipment in recent years, there is a strong demand for capacitors having high frequency characteristics, which are of low impedance even in a high frequency range. As capacitors available to meet such demand of the market, capacitors using solid electrolyte layers such as manganese dioxide, polypyrrole or polythiophene are known.

FIG. 3 is a sectional view showing the configuration of a conventional solid electrolytic capacitor. In FIG. 3, a dielectric oxide film 33 formed by an positive electrode oxidation method is disposed on the surface of an positive electrode body 32. The positive electrode body 32 is enclosed in the dielectric oxide film 33. The positive electrode body 32 is made by sintering valve metal such as aluminum and titanium into porous metal. Positive electrode lead wire 31 is connected to the positive electrode body 32, and a part of the positive electrode lead wire 31 is outwardly led from the surface of the dielectric oxide film 33.

A solid electrolyte layer 34 such as manganese or polypyrrole is disposed on the surface of the positive electrode body 32 having the dielectric oxide film 33, and a negative electrode layer 35 comprising a carbon layer and a conductor layer is disposed on the solid electrolyte layer 34. A capacitor element 36 is formed in this way. An positive electrode terminal 37 is connected to the positive electrode lead wire 31 of a capacitor element 36. A negative electrode terminal 39 is connected to the negative electrode layer 35 via conductive adhesive 38. Facing resin 40 being electrically insulative is disposed so as to cover the capacitor element 36. The positive electrode terminal 37 and the negative electrode terminal 39 are partially exposed to the outside. The solid electrolytic capacitor is configured in this way.

In such conventional solid electrolytic capacitor, the solid electrolyte layer 34 is extremely low in resistibility, and it has been able to reduce the equivalent series resistance (hereinafter called ESR characteristic) of the solid electrolytic capacitor.

However, in a conventional solid electrolytic capacitor as mentioned above, in case the oxide of transition metal such as manganese dioxide, or solid electrolyte layer 34 contains a conductive polymer comprising heterocyclic compound such as polypyrrole, and in a case a carbon layer is formed on the solid electrolyte layer 34 by use of aqueous solution including carbon particles and coagulation stabilizer, it will sometimes cause generation of uneven carbon layers or thin film portions because the surface tension of the aqueous solution is too high. Therefore, it has been extremely difficult to form uniform carbon layers.

Accordingly, lots of defective products have been generated with respect to ESR characteristic and capacity utilization factor, and as a result, there has been a problem of lowering in yield of the products.

The present invention provides a solid electrolytic capacitor assuring excellent ESR characteristic and capacity utilization factor, which has been reduced in contact resistance between the solid electrolyte layer and negative electrode layer, and a method for manufacturing same.

SUMMARY OF THE INVENTION

A solid electrolytic capacitor in accordance with the present invention comprises
  an positive electrode body,
  a dielectric layer formed on the surface of the positive electrode body,
  a solid electrolyte layer formed on the surface of the dielectric layer,
  a negative electrode layer disposed on the surface of the solid electrolyte layer,
  an positive electrode terminal electrically connected to the positive electrode body, and
  a negative electrode terminal electrically connected to the negative electrode layer,
  wherein the negative electrode layer includes a carbon layer, and
  the carbon layer contains carbon particles, and a benzene compound represented by chemical formula 1.

Chemical formula 1 where each of R1, R2, R3, and R4 has H, OH group, COOH group, or alkyl group.

Preferably, the positive electrode body includes valve metal, and the dielectric layer includes a dielectric oxide film formed by oxidation of the valve metal.

Preferably, the negative electrode layer further includes a conductor layer, a carbon layer is disposed on the surface of the dielectric layer, and the conductor layer is disposed on the surface of the carbon layer.

Preferably, the positive electrode body includes valve metal; the dielectric layer includes a dielectric oxide film formed by oxidation of the valve metal; the negative electrode layer further includes a conductor layer; a carbon layer is disposed on the surface of the dielectric oxide film; and the conductor layer is disposed on the surface of the carbon layer.

Preferably, the solid electrolytic capacitor further comprises facing resin; each of the positive electrode terminal and the negative electrode terminal is partially exposed; and the facing resin is disposed so as to cover the positive electrode body, the dielectric layer, the solid electrolyte layer, and the negative electrode layer.

Due to this configuration, the carbon layer formed is fine and uniform. Accordingly, the contact resistance between the solid electrolyte layer and the carbon layer will be reduced. Further, the contact resistance between the carbon layer and the conductor layer will also be reduced. As a result, it is possible to obtain a solid electrolyte capacitor assuring excellent ESR characteristic and capacity utilization factor.

DESCRIPTION OF THE MARKS

Figure 1:
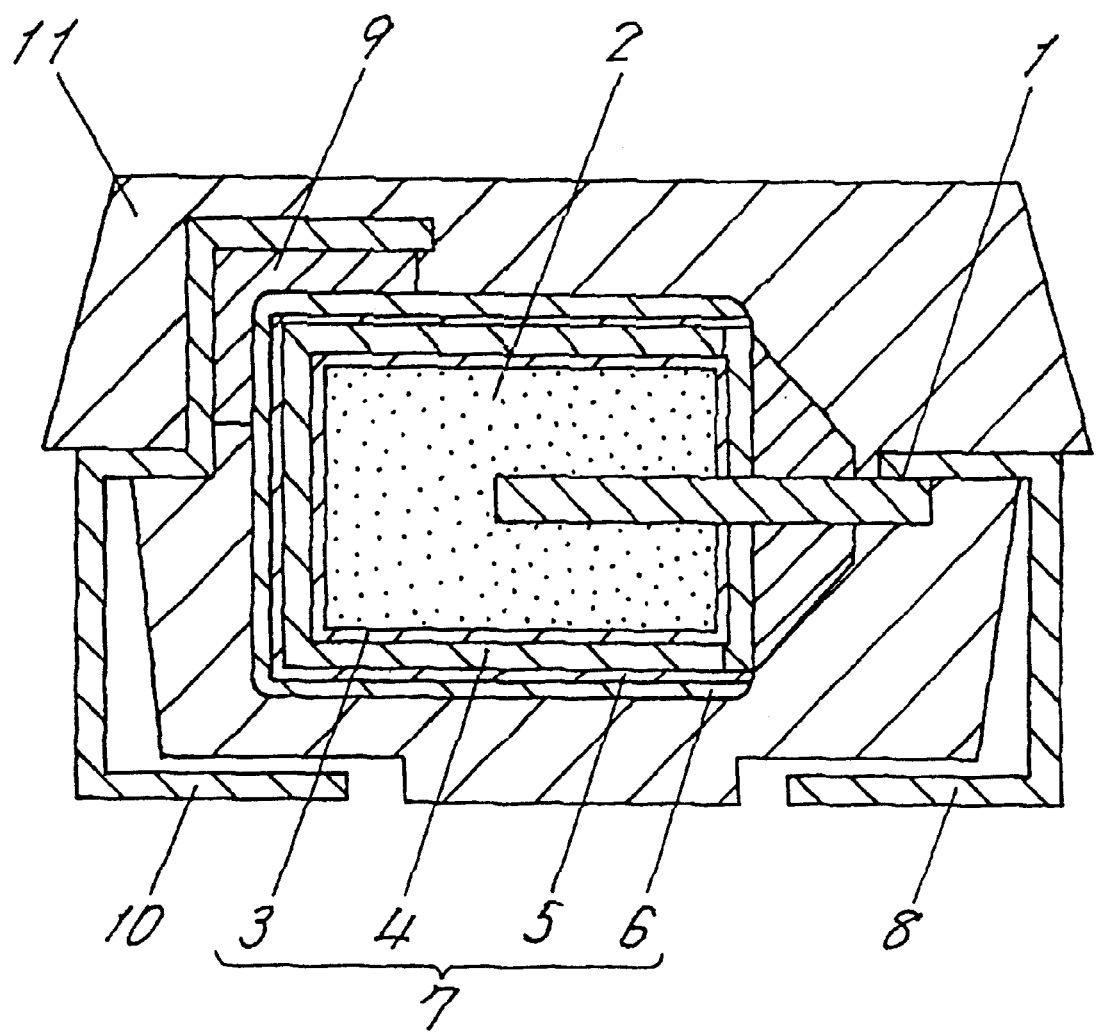
FIG. 1 is a sectional view showing the configuration of a solid electrolytic capacitor in accordance with the exemplary embodiment 1 and the exemplary embodiment 2 of the present invention.

1 Positive electrode lead wire
2 Positive electrode body
3 Dielectric oxide film
4 Solid electrolyte layer
5 Carbon layer
6 Silver paste conductor layer
7 Capacitor element
8 Positive electrode terminal
9 Conductive adhesive
10 Negative electrode terminal
11 Facing resin

DETAILED DESCRIPTION OF THE INVENTION

In a solid electrolytic capacitor and its manufacturing method of the present invention, a carbon layer serves to relieve the surface tension generated when a carbon layer is formed.

That is, a solid electrolytic capacitor in an embodiment of the present invention comprises an positive electrode body formed of valve metal; a dielectric oxide film, a solid electrolyte layer and a negative electrode layer which are laminated in order on the surface of the positive electrode body; electrically insulative resin as a feeding disposed so as to cover these laminated layers; an positive electrode terminal led out of the positive electrode body; and a negative electrode terminal led out of the negative electrode layer. Each of the positive electrode terminal and the negative electrode terminal is partially exposed at the surface of the resin. The negative electrode layer includes a carbon layer and a conductor layer. The carbon layer contains carbon particles and a benzene compound represented by the chemical formula 1. Due to this configuration, the carbon layer formed is fine and uniform. Accordingly, the contact resistance between the solid electrolyte layer and the carbon layer will be reduced. Further, the contact resistance between the carbon layer and the conductive layer will also be reduced. As a result, it is possible to obtain a solid electrolytic capacitor assuring excellent ESR characteristic and capacity utilization factor.

Chemical formula 1 where each of R1, R2, R3, and R4 has H, OH group, COOH group, or alkyl group.

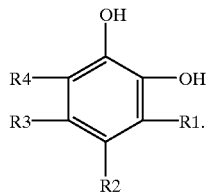

Preferably, the carbon particles, and the benzene compound represented by the chemical formula 1 are contained at a ratio of one part by weight of carbon particles and 0.1–1.8 part by weight of benzene compound respectively by the chemical formula 1. With this configuration, the carbon layer formed is fine and uniform.

Preferably, the benzene compound represented by the chemical formula 1 which is included in the carbon layer contains catechol or pyrogallol. As pyrogallol, for example, a benzene compound having $C_6H_6O_3$ as shown by the chemical formula 2 is used. As catechol, for example, a benzene compound having $C_6H_6O_2$ as shown by the chemical formula 3 is used.

Chemical formula 2

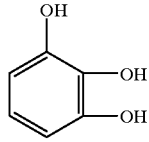

Chemical formula 3

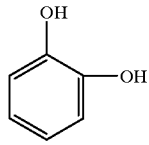

A method for manufacturing a solid electrolytic capacitor in an embodiment of the present invention comprises (a) a process of forming a dielectric oxide film and solid electrolyte layer in order on the surface of an positive electrode body formed by sintering valve metal into porous metal or on the surface of an positive electrode body with the foil of valve metal surface-roughened;

(b) a process of forming a negative electrode layer by forming a carbon layer containing carbon particles and a benzene compound represented by the chemical formula 1 and a conductive layer of silver paste on the surface of the solid electrolyte layer; and (c) after that, a process of facing the whole with resin in a manner such that each of an positive electrode terminal led out to the positive electrode body and a negative electrode terminal led out of the negative electrode layer is partially exposed.

According to this method, it is possible to reliably obtain a solid electrolyte capacitor assuring excellent ESR characteristic and capacity utilization factor.

Exemplary embodiment 1

FIG. 1 is a sectional view showing the configuration of a solid electrolyte capacitor in accordance with the exemplary embodiment 1 of the present invention. In FIG. 1, the solid electrolyte capacitor comprises an positive electrode 2 formed of valve metal; a dielectric oxide film 3, a solid electrolyte layer 4 and a negative electrode layer which are laminated in order on the surface of the positive electrode body 2; facing resin 11 disposed so as to cover these laminated layers; positive electrode lead wire 1 led out of the positive electrode body 2; an positive electrode terminal 8 connected to the positive electrode lead wire 1; and a negative electrode terminal 10 led out of the negative electrode layer.

Each of the positive electrode terminal 8 and the negative electrode terminal 10 is partially exposed at the surface of the facing resin 11. The solid electrolyte layer 4 contains manganese dioxide. As valve metal, aluminum and titanium or the like metal are used, and these metals are sintered into porous metals. The dielectric oxide film 3 is formed by an positive electrode oxidation method. The negative electrode layer includes a carbon layer 5 and a silver paste conductor layer 6. The negative electrode terminal 10 is connected to the negative electrode layer via a conductive adhesive 9.

The carbon layer 5 contains carbon particles and a benzene compound represented by the chemical formula 1.

The configuration mechanism of carbon particles and a benzene compound shown by the chemical formula 1 is unknown. However, the carbon layer 5 obtained is fine and uniform because of containing both of carbon particles and a benzene compound shown by the chemical formula 1. Accordingly, the contact resistance between the solid electrolyte layer 4 and the carbon layer 5 will be reduced.

The carbon layer 5 contains a benzene compound shown by the chemical formula 1 in a range of 0.1 to 1.8 part by weight of same against one part by weight of carbon particles. Since the carbon layer 5 has such a range of chemical composition, the carbon layer 5 obtained is fine and uniform. Accordingly, the contact resistance between the solid electrolyte layer 4 and the carbon layer 5 will be reduced. Favorably, the carbon layer 5 contains a benzene compound shown by the chemical formula 1 in a range of 0.2 to 1.2 part by weight of some against one part by weight of carbon particles. Due to this configuration, the result to be obtained will be further improved.

In case the content of the benzene compound represented by the chemical formula 1 is less than 0.1 part by weight, a uniform carbon layer will not be obtained. Also, the content of the benzene compound represented by the chemical formula 1 exceeds 1.8 part by weight, the carbon layer formed will be thick and not uniform, and it is unable to obtain a uniform layer.

As a benzene compound shown by the chemical formula 1, at least one of catechol and pyrogallot is preferable in particular. These compounds may relieve the surface tension that becomes extremely high during forming of a carbon layer. Accordingly, the contact resistance between the solid electrolyte layer and the carbon layer will be reduced. As a result, it is possible to obtain a solid electrolytic capacitor having excellent ESR characteristics in a high frequency range.

The carbon layer 5 is formed through processes such as, a process of preparing an alkaline (pH8~11) mixture or solution suspended by adding carbon particles of submicron in diameter, a benzene compound represented by the chemical formula 1, and a surface active agent into water, and a process of applying the alkaline mixture to the surface of solid electrolyte layer 4 and drying of same.

Or, a process of forming the carbon layer includes:
(a) a step of preparing a suspension of carbon particles and liquid;
(b) a step of preparing a mixed suspension by dissolving a benzene compound shown by the chemical formula 1 in the suspension;
(c) a step of immersing the positive electrode body having the solid electrolyte layer into the mixed suspension;
(d) a step of taking the positive electrode body having the electrolyte layer out of the mixed suspension; and
(e) a step of drying the positive electrode body having the solid electrolyte layer, which is moistened with the mixed suspension.

Because the mixture (or solution) is alkaline, the dispersion of carbon particles will be improved. Accordingly, it is possible to increase the stability of the benzene compound represented by the chemical formula 1. In case the mixture (or solution) is acidic (in terms of pH), the dispersion of carbon particles becomes worse, and consequently, the benzene compound will be lowered in stability.

The content of carbon particles in the mixture (or solution) is preferable to be in a range from 2 wt % to 10 wt %. In this way, the dispersion of carbon particles will be further improved. As a result, the carbon layer 5 obtained is fine and uniform. When the content of carbon particles in the mixture (or solution) is less than 2 wt % or over 10 wt %, the above performance will be lowered a little.

Specific examples are described in the following.

EXAMPLE 1

Firstly, tantalum powder is molded in a manner such that a part of tantalum wire is exposed. After that, the moldings is sintered. In this way, an positive electrode body of 1.4 mm in thickness, 3.0 mm in width, and 3.8 mm in length was obtained. The surface of the positive electrode body is subjected to formation of 20V by using phosphate solution. Thus, a dielectric oxide film was formed as a dielectric layer. A lead wire is connected to the positive electrode body and is led out of the positive electrode body.

Next, the positive electrode body having the dielectric oxide film was immersed into 20 % of manganese nitrate solution at 25° C. for 10 seconds, and was taken out thereafter. After that, excess part of the manganese nitrate solution sticking to the surface of the positive electrode body having the dielectric oxide film was blown away by air. Subsequently, the positive electrode body moistened with manganese nitrate solution was treated at 300° C. for 5 minutes, increasing the temperature at a speed of over 250° C. within one minute. Thus, the manganese nitrate solution was thermally decomposed and then a solid electrolyte layer of manganese dioxide was formed on the surface of the dielectric oxide film.

Next, the surface of the solid electrolyte layer was impregnated with alkaline solution containing carbon particles and pyrogallol. Pyrogallol is used as a benzene compound shown by the chemical formula 1. The alkaline solution contains 2 wt % of carbon particles and 2 wt % of pyrogallol, and ammonia, The solution is adjusted to pH10 by ammonia. The positive electrode body impregnated with the alkaline solution was dried at 150° C. In this way, a carbon layer was formed on the surface of the solid electrolyte layer. After that, a silver paste was formed as a conductive layer on the surface of the carbon layer. Thus, a capacitor element was obtained.

Next, a positive electrode terminal was connected to a tantalum wire. Also, a negative electrode terminal is connected to a negative electrode layer by using conductive adhesive. That is, the negative electrode terminal is connected to the negative electrode layer via the conductive adhesive. Facing resin is disposed to cover the capacitor element in a manner such that each of the positive electrode terminal and the negative electrode terminal is partially exposed. In this way, a solid electrolyte capacitor having a shape of 7.3 mm×4.3 mm×2.8 mm in dimension was manufactured.

EXAMPLE 2

In this example 2, a carbon layer is formed by using alkaline solution containing carbon particles and catechol as a benzene compound shown by the chemical formula 1. The other configurations to obtain a solid electrolytic capacitor are the same as in the above example 1.

EXAMPLE 3

In this example 3, a carbon layer is formed by using alkaline solution of pH10 which contains 5 wt % of carbon particles and 0.5 wt % of pyrogallol. In this case, the carbon layer contains one part by weight of carbon particles and 0.1 part by weight of pyrogallol. The other configurations to obtain a solid electrolytic capacitor are the same as in the above example 1.

EXAMPLE 4

In this example 4, a carbon layer is formed by using alkaline solution of pH10 which contains 5 wt % of carbon particles and 2 wt % of pyrogallol. In this case, the carbon layer contains one part by weight of carbon particles and 0.4 part by weight of pyrogallol. The other configurations to obtain a solid electrolytic capacitor are the same as in the above example 1.

EXAMPLE 5

In this example 5, a carbon layer is formed by using alkaline solution of pH10 which contains 5 wt % of carbon particles and 5 wt % of pyrogallol. In this case, the carbon layer contains one part by weight of carbon particles and 1.0 part by weight of pyrogallol. The other configurations to obtain a solid electrolytic capacitor are the same as in the above example 1.

EXAMPLE 6

In this example 6, a carbon layer is formed by using alkaline solution of pH10 which contains 5 wt % of carbon particles and 6 wt % of pyrogallol. In this case, the carbon layer contains one part by weight of carbon particles and 1.2 part by weight of pyrogallol. The other configurations to obtain a solid electrolytic capacitor are the same as in the above example 1.

EXAMPLE 7

In this example 7, a carbon layer is formed by using alkaline solution of pH10 which contains 5 wt % of carbon particles and 9 wt % of pyrogallol. In this case, the carbon layer contains one part by weight of carbon particles and 1.8 part by weight of pyrogallol. The other configurations to obtain a solid electrolytic capacitor are the same as in the above example 1.

EXAMPLE 8

In this example 8, a carbon layer is formed by using alkaline solution of pH10 which contains 10 wt % of carbon particles and 10 wt % of pyrogallol. In this case, the carbon layer contains one part by weight of carbon particles and 1.0 part by weight of pyrogallol. The other configurations to obtain a solid electrolytic capacitor are the same as in the above example 1.

COMPARATIVE EXAMPLE 1

In this comparative example 1, a carbon layer is formed by using alkaline solution of pH10 which contains 2 wt % of carbon particles. That is, the alkaline solution does not contain a benzene compound shown by the chemical formula 1. The other configurations to obtain a solid electrolytic capacitor are the same as in the above example 1.

COMPARATIVE EXAMPLE 2

In this comparative example 2, a carbon layer is formed by using alkaline solution of pH10 which contains 5 wt % of carbon particles. That is, the alkaline solution does not contain a benzene compound shown by the chemical formula 1. The other configurations to obtain a solid electrolytic capacitor are the same as in the above example 1.

With respect to the solid electrolytic capacitors thus obtained in the examples 1 to 8 and the comparative examples 1 and 2, the initial characteristics (electrostatic capacity "C", equivalent series resistance "ESR", leak current "LC"), capacity change rate "ΔC" and ESR change rate "ΔESR" after 1,000 hours of leaving at 105° C. are shown in Table 1. These performances were measured at temperatures in a range of 25~30° C. The electrostatic capacity was measured at 120 Hz. ESR was measured at 100 kHz. As the leak current, the current value was measured 30 seconds after applying the rated voltage. Each of the measured values is shown by averaging n=30 specimens. The rated specification of the solid electrolytic capacitor is 6.3WV, 150 µF.

TABLE 1

|  | Initial values | | | After 1,000 hours | |
| --- | --- | --- | --- | --- | --- |
|  | C (µF) | ESR (mΩ) | LC (µA) | ΔC (%) | ΔESR (%) |
| Example 1 | 152 | 30 | 15 | −2.5 | 1.5 |
| Example 2 | 154 | 28 | 14 | −2.1 | 1.3 |
| Example 3 | 150 | 24 | 13 | −2.0 | 1.2 |
| Example 4 | 153 | 22 | 11 | −1.8 | 0.9 |
| Example 5 | 154 | 21 | 10 | −1.7 | 0.8 |
| Example 6 | 159 | 23 | 12 | −1.8 | 0.9 |
| Example 7 | 156 | 25 | 13 | −2.2 | 1.3 |
| Example 8 | 155 | 24 | 13 | −2.1 | 1.2 |
| Comparative example 1 | 121 | 75 | 94 | −15 | 17 |
| Comparative example 2 | 126 | 72 | 82 | −12 | 11 |

As shown in Table 1, the solid electrolytic capacitors in the example 1 and the example 2, containing carbon particles and pyrogallol or catechol in the carbon layer, have better initial characteristics than those in the comparative examples. Further, the solid electrolytic capacitors in the present examples maintain excellent performance even after 1,000 hours of leaving at high temperatures. That is, in the present examples, the electrostatic capacity is 152–154 µF, ESR is 28–30 mΩ, and leak current is 14–15 µA. Also, after 1,000 hours of leaving at 105° C., the capacity change rate (ΔC) is 2.1~2.5%, and ESR change rate is 1.3–1.5%. On the other hand, in the comparative example 1, the electrostatic capacity is 121 µF, ESR is 75 mΩ or less, and leak current is 94 µA. Furthermore, after 1,000 hours of leaving at 105° C., the capacity change rate (ΔC) is 15%, and ESR change rate is 17%.

Also, the solid electrolytic capacitors in the examples 3 to 8 show the characteristics of a solid electrolytic capacitor which can be obtained by changing the content of pyrogallol in the carbon layer forming process. Because the carbon layer contains 0.2 part to 1.8 part by weight of pyrogallol against one part by weight of carbon particles, the initial characteristics obtained are better than those in the comparative example 2. Further, the solid electrolytic capacitors in the present examples maintain excellent performance even after 1,000 hours of leaving at high temperatures. That is, the electrostatic capacity is 150–159 µF, ESR is 21–25 mΩ, and leak current is 10–13 µA or less. Also, after 1,000 hours or leaving at 105° C., the capacity change rate (ΔC) is 1.7–2.1%, and ESR change range is 0.8–1.3%. On the other hand, in comparative example 2, the electrostatic capacity is 126 µF, ESR is 72 mΩ or less, and leak current is 82 µA. Furthermore, after 1,000 hours of leaving at 105° C., the capacity change rate (ΔC) is 12%, and ESR change rate is 11%.

Thus, the solid electrolytic capacitors in the present examples are 150 µF or over in electrostatic capacity, 35 mΩ or less in ESR, and 20 µA or less in leak current. Furthermore, the solid electrolytic capacitors in the present examples are, after 1,000 hours of leaving at 105° C., within 3% in capacity change rate (ΔC) and within 2% in ESR change rate. On the other hand, the solid electrolytic capacitors in the comparative examples are 126 µF or less in electrostatic capacity, 72 mΩ or over in ESR, and 82 µA or over in leak current. Further, the solid electrolytic capacitors in the comparative examples, after 1,000 hours of leaving at 105° C., are 12% or over in capacity change rate (ΔC) and 11% or over in ESR change rate.

Exemplary embodiment 2

In the exemplary embodiment 2, a solid electrolyte layer is formed of a conductive polymer. The other configurations to obtain a solid electrolytic capacitor are the same as in the above exemplary embodiment 1.

As a conductive polymer, it is preferable to use a heterocyclic polymer such as polypyrrole, polythiophene, polyaniline, or poly-3, 4-ethylene dioxythiophene.

These conductive polymers are formed through chemical oxidative polymerization of heterocyclic monomers.

The first method of forming solid electrolyte layer 4 of conductive polymer comprises (a) a process of impregnating the surface of dielectric oxide film 3, formed on the surface of positive electrode body 2, with a polymerizing solution containing a heterocyclic monomer, and further, impregnating same with an oxidizing solution containing an oxidizing agent, followed by cleaning and recovery formation; and (b) a process of repeating the process (a) by a plurality of times.

The second method of forming solid electrolyte layer 4 of conductive polymer comprises (c) a process of impregnating the surface of dielectric oxide films 3, formed on the surface of positive electrode body 2, with a mixed solution containing a heterocyclic monomer and an oxidizing agent, and (d) a process of repeating the process (c) by a plurality of times.

The third method of forming solid electrolyte layer 4 of conductive polymer comprises (e) a process of impregnating the surface of dielectric oxide film 3, formed on the surface of positive electrode body 2, with a polymerizing solution containing a heterocyclic monomer, and further, impregnating same with an oxidizing solution containing an oxidizing agent, and further, with a mixed solution containing a heterocyclic monomer and an oxidizing agent, followed by cleaning and recovery formation; and (f) a process of repeating the process (e) by a plurality of times.

As a heterocyclic monomer, it is preferable to use a monomer such as pyrrole, thiophene, or 3, 4-ethylen dioxthiophene. Solid electrolyte layer 4 of conductive polymer having a relatively high conductivity can be obtained through chemical oxidative polymerization of these heterocyclic monomers.

Also, as oxidizing agents, for example, ferric salt, persulfate, permanganate, and hydrogen peroxide are employed. It is preferable to use iron sulfate or ferric p-toluene sulfonate as an oxidizing agent.

The examples in the exemplary embodiment 2 will be described in the following.

EXAMPLE 21

Firstly, tantalum powder is molded in a manner such that a part of tantalum wire is exposed. After that, the moldings is sintered. In this way, an positive electrode body of 1.4 mm in thickness, 3.0 mm in width, and 3.8 mm in length was obtained. The surface of the positive electrode body is subjected to formation at 20V by using phosphate solution. Thus, a dielectric oxide film was formed as a dielectric layer. The lead wire is connected to the positive electrode body and is exposed at the surface of the dielectric oxide film.

Next, the positive electrode body having the dielectric oxide film was immersed in a polymerizing solution containing a heterocyclic monomer for 5 minutes, and taken out thereafter. The polymerizing solution contains ethylene glycol solution, sodium alkyl naphthalene sulfonate, and heterocyclic monomer. Pyrrole is used as a heterocyclic monomer. After that, the positive electrode body having the dielectric oxide film is immediately immersed in an oxidizing solution including an oxidizing agent for 10 minutes, and taken out thereafter. The oxidizing solution contains ethylene glycol solution and ferrous sulfate (III). The positive electrode body was cleaned and then subjected to recovery formation, followed by drying at 100° C. A series of these operations were repeated 10 times. In this way, a conductive polymer as a solid electrolyte layer was formed on the surface of the positive electrode body.

Next, the surface of the solid electrolyte layer was impregnated with alkaline solution containing carbon particles and pyrogallol. Pyrogallol contains a benzene compound of chemical formula 1. The alkaline solution contains 2 wt % of carbon particles and 2 wt % of pyrogallol, and ammonia. The solution is adjusted to pH10 by ammonia. The positive electrode body impregnated with the alkaline solution was dried at 150° C. In this way, a carbon layer was formed on the surface of the solid electrolyte layer. After that, a silver paste conductor layer was formed on the surface of the carbon layer. Thus, a capacitor element was obtained.

Next, a positive electrode terminal was connected to a tantalum wire. Also, a negative electrode terminal was connected to a negative electrode layer by using conductive adhesive. That is, the negative electrode terminal is connected to the negative electrode layer via the conductive adhesive. Facing resin is disposed to cover the capacitor element in a manner such that each of the positive electrode terminal and the negative electrode terminal is partially exposed. In this way, a solid electrolytic capacitor having a shape of 7.3 mm×4.3 mm×2.8 mm in dimension was manufactured.

EXAMPLE 22

In the example 22, the solid electrolyte layer is formed by using a polymerizing solution containing thiophene as a heterocyclic monomer. That is, the solid electrolyte layer contains polythiophene formed through polymerization of thiophene. The other configurations to obtain a solid electrolytic capacitor are the same as in the above example 21.

EXAMPLE 23

In this example 23, a solid electrolyte layer is formed by using a polymerizing solution containing aniline as a heterocyclic monomer. That is, the solid electrolyte layer contains polyaniline formed through polymerization of aniline. The other configurations to obtain a solid electrolytic capacitor are the same as in the above example 21.

EXAMPLE 24

In this example 24, a solid electrolyte layer is formed by using a polymerization solution containing 3. 4-ethylene dioxythiophene as a heterocyclic monomer. That is, the solid electrolyte layer contains poly-3, 4-ethylene dioxythiophene formed through polymerization of 3, 4-ethylene dioxythiophene. The other configurations to obtain a solid electrolytic capacitor are the same as in the above example 21.

COMPARATIVE EXAMPLE 3

In this comparative example 3, a carbon layer is formed by using alkaline solution of pH10 which contains 2 wt % of carbon particles. That is, the alkaline solution does not contain a benzene compound represented by the chemical formula 1. The other configurations to obtain a solid electrolytic capacitor are the same as in the above example 21.

With respect to the solid electrolytic capacitors thus obtained in the examples 21~24 and the comparative examples 3, the initial characteristics (electrostatic capacity "C", equivalent series resistance "ESR", leak current "LC"), capacity change rate "ΔC" and ESR change rate "ΔESR" after 1,000 hours of leaving at 105° C. are shown in Table 2. These performances were measured at temperatures in a range of 25~30° C. The electrostatic capacity was measured at 120 Hz. ESR was measured at 100 kHz. As the leak current, the current value was measured 30 seconds after applying the rated voltage. Each of the measured values is shown by averaging n=30 specimens. Here, the rating of the solid electrolytic capacitor is 6.3WV, 150 μF.

TABLE 2

|  | Initial values | | | After 1,000 hours | |
| --- | --- | --- | --- | --- | --- |
|  | C (μF) | ESR (mΩ) | LC (μA) | ΔC (%) | ΔESR (%) |
| Example 21 | 152 | 20 | 11 | −1.8 | 1.0 |
| Example 22 | 154 | 21 | 10 | −1.9 | 1.1 |
| Example 23 | 153 | 20 | 11 | −1.8 | 1.1 |
| Example 24 | 158 | 18 | 9 | −1.6 | 0.8 |
| Comparative example 3 | 126 | 82 | 82 | −11 | 12 |

As shown in Table 2, the solid electrolytic capacitors in the examples 21 to 24, containing carbon particles and pyrogallol or catechol in the carbon layer, have better initial characteristics than those in the comparative example. Further, the solid electrolytic capacitors in the present examples maintain excellent performance even after 1,000 hours of leaving at high temperatures. That is, in the present examples, the electrostatic capacity is 152–158 μF, ESR is 18–21 mΩ, and leak current is 9–11 μA. Also, after 1,000 hours of leaving at 105° C., the capacity change rate (ΔC) is 1.6–1.8%, and ESR change rate is 0.8–1.1%. On the other hand, in the comparative example 3, the electrostatic capacity is 126 μF, ESR is 82 mΩ or less, and leak current is 82 μA. Furthermore, after 1,000 hours of leaving at 105° C., the capacity change rate (ΔC) is 11%, and ESR change rate is 12%.

Thus, the solid electrolytic capacitors in the example 21 to 24 have better initial characteristics than those in the comparative example, and are also lower in capacity change rate and ESR change rate after 1,000 hours of leaving at 105° as compared with the comparative example.

Exemplary embodiment 3

Figure 2:
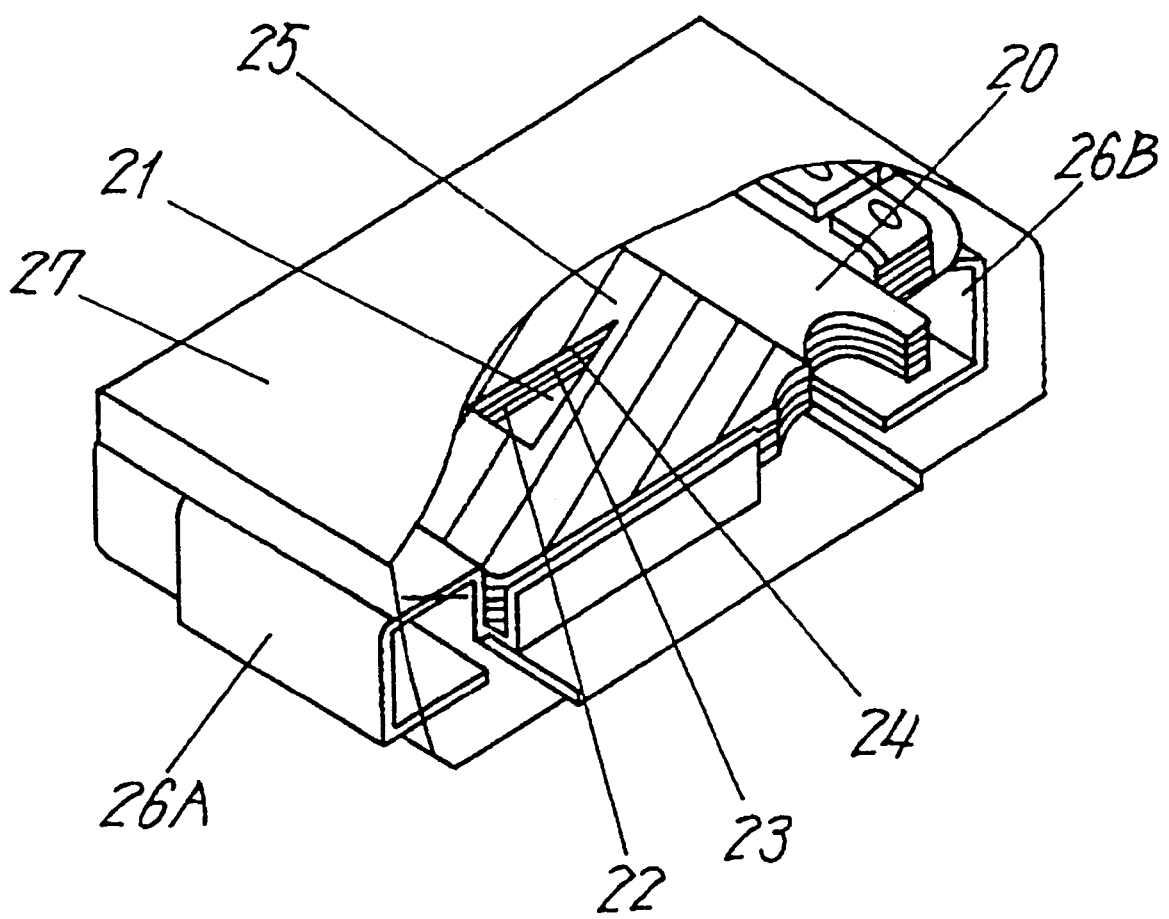
FIG. 2 is a perspective view showing the configuration partially broken away of a solid electrolytic capacitor in accordance with the exemplary embodiment 3 of the present invention.
Figure 3:
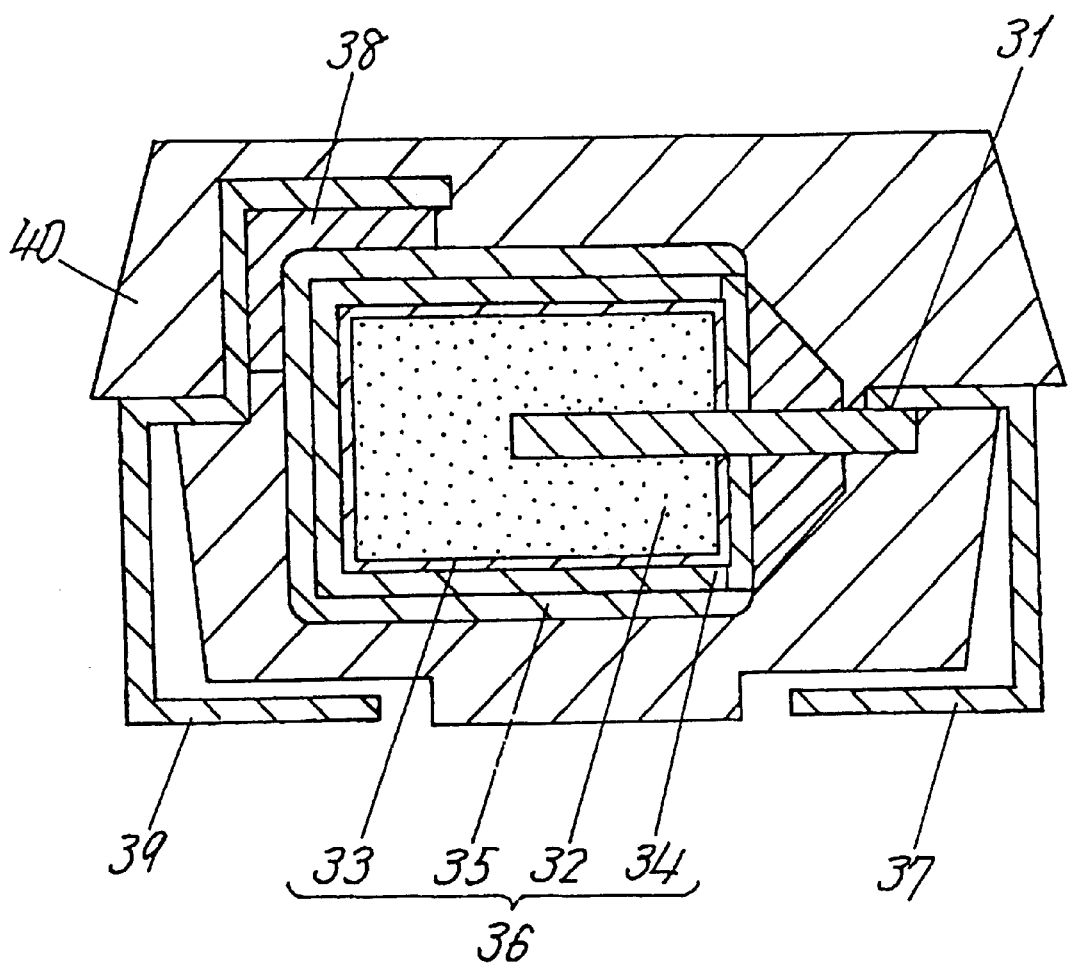
FIG. 3 is a sectional view showing the configuration of a conventional solid electrolyte capacitor.

FIG. 2 is a perspective view, partially broken away, showing the configuration of a solid electrolytic capacitor in the exemplary embodiment 3 of the present invention. In FIG. 2, the solid electrolytic capacitor comprises an positive electrode body 21 having a dielectric oxide film 22, a manganese dioxide layer 23, a solid electrolyte layer 24, a negative electrode layer 25, an insulation resist 20, terminal number 26A, 26B, and facing resin 27.

The positive electrode body 21 is formed of aluminum foil as valve metal, and the positive electrode body is rough-surfaced. The aluminum foil surface is rough-surfaced by etching. After that, the rough surface of the aluminum foil is subjected to formation, and a dielectric oxide film 22 is formed on the aluminum foil surface. The insulation resist 20 is disposed to separate the aluminum foil into an positive electrode portion and a negative electrode portion. That is, the aluminum foil is separated into an positive electrode portion and a negative electrode portion by the insulation resist 20. Manganese dioxide layer 23 and solid electrolyte layer 24 are formed on the negative electrode portion of the aluminum foil. That is, the negative electrode portion includes the manganese dioxide layer 23 and the solid electrolyte layer 24. As solid electrolyte layer 24, a conductive polymer such as polypyrrole, polythiophene or polyaniline is employed. The negative electrode layer 25 is arranged over the solid electrolyte layer 24. The negative electrode layer 25 includes a carbon layer, and silver paste as a conductor layer. A capacitor element is configured in this way. Using a single or a plurality of such capacitor's elements laminated, the terminal member 26A is connected to the positive electrode portion, and the terminal member 26B is connected to the negative electrode portion. After that, the facing resin 27 is molded so as to cover the capacitor element. Thus, a solid electrolytic capacitor is formed.

The manganese dioxide layer 23 is formed through a process of impregnating the positive electrode body with manganese nitrate solution, a process of natural drying, followed by a process of thermal decomposition at 300° C.

It is also possible to form a pre-coating layer having a conductive material such as a conductive polymer or the like in place of a manganese dioxide layer.

The solid electrolyte layer having a conductive polymer is formed through electrolytic polymerization of a heterocyclic monomer. As a heterocyclic monomer, for example, it is preferable to use a monomer such as pyrrole, thiophene, aniline, or 3, 4-ethylene dioxythiophene. By oxidative polymerization of these heterocyclic monomers, it is possible to relatively easily obtain solid electrolyte layer 4 of conductive polymer having high conductivity.

For example, in a polymerizing solution including a heterocyclic monomer such as pyrrole, applying an electric field thereto from an external electrode results in electrolytic polymerization of the pyrrole, thereby forming polypyrrole. In this way, a solid electrolytic capacitor having excellent characteristics can be readily obtained in a relatively short period of time.

Also, the carbon layer may be formed according to the same method as in the above exemplary embodiment 1.

Examples in the exemplary embodiment 3 will be described in the following.

EXAMPLE 31

A surface-roughened aluminum foil increased in surface area by about 125 times was formed by etching the surface of aluminum foil as an positive electrode body. An insulative resist tape was affixed to the aluminum foil to separate the aluminum foil into a negative electrode portion and an positive electrode portion. Immersing the positive electrode body of a capacitor element into ammonium dihydrogen phosphate solution, DC12V was applied to the positive electrode body for 20 minutes. The effective area of the positive electrode body is 3.2 mm×3.9 mm. The concentration of ammonium dihydrogen phosphate solution is 0.3 wt %, and the temperature in the solution is 70° C. Thus, an oxide film on positive electrode was formed as a dielectric layer.

Next, the positive electrode body having the oxide film on positive electrode was immersed into 20 wt % manganese nitrate solution at 25° C. for 3 seconds, and was taken out thereafter. After that, excess part of the manganese nitrate solution sticking to the surface of the positive electrode body having the oxide film on positive electrode was blown away by air. Subsequently, the positive electrode body moistened with manganese nitrate solution was treated at 300° C. for 5 minutes, increasing the temperature at a speed of over 250° C. within one minute. Thus, the manganese nitrate solution was thermally decomposed and then a solid electrolyte layer of manganese dioxide was formed on the surface of the dielectric layer.

Next, the positive electrode body having the dielectric layer and solid electrolyte layer was immersed in an ammonium dihydrogen phosphate solution, 3 wt % in concentration and 70° C. in liquid temperature, and then, DC10V was applied to the positive electrode body for 10 minutes, thereby performing re-formation treatment. Subsequently, a solid electrolyte layer of conductive polymer of polypyrrole film was formed on the manganese dioxide layer by the above-mentioned electrolytic polymerization method.

Next, the surface of the solid electrolyte layer was impregnated with alkaline solution containing carbon particles and pyrogallol. Pyrogallol is used as a benzene compound of chemical formula 2. The alkaline solution contains 5 wt % of carbon particles and 2 wt % of pyrogallol, and ammonia. The solution is adjusted to pH10 by ammonia. The positive electrode body impregnated with the alkaline solution was dried at 150° C. In this way, a carbon layer was formed on the surface of the solid electrolyte layer. In that case, the carbon layer contains 0.2 part by weight of pyrogallol against one part by weight of carbon particles. After that, a silver paste conductor layer was formed on the surface of the carbon layer. In this way, a conductor layer on negative electrode was formed. Thus, a capacitor element was obtained. A lead wire was led from each of the positive electrode body and the conductor layer on negative electrode. After that, facing resin is disposed so a to cover the capacitor element. Thus, a solid electrolytic capacitor having a shape of 7.3 mm×4.3 mm×2.8 mm in dimension was manufactured.

EXAMPLE 32

In the example 32, a carbon layer is formed by using alkaline solution of pH10 which contains 5 wt % of carbon particles and 9 wt % of pyrogallol. In this case, the carbon layer contained one part by weight of carbon particles and 1.8 part by weight of pyrogallol. The other configurations to obtain a solid electrolytic capacitor are the same as in the above example 31.

COMPARATIVE EXAMPLE 4

In this comparative example 4, a carbon layer is formed by using alkaline solution of pH10 which contains 5 wt % of carbon particles. That is, the alkaline solution does not contain a benzene compound shown by the chemical formula 1. The other configurations to obtain a solid electrolytic capacitor are the same as in the above example 31.

With respect to the solid electrolytic capacitors thus obtained in the examples 31, 32 and the comparative example 4, the initial characteristics (electrostatic capacity "C", equivalent series resistance "ESR", leak current "LC"), capacity change rate "ΔC" and ESR change rate "ΔESR" after 1,000 hours of leaving at 105° C. are shown in Table 1. These performances were measured at temperatures of 25 to 30° C. The electrostatic capacity was measured at 120 Hz. ESR was measured at 100 kHz. As the leak current, the current value was measured 30 seconds after applying the rated voltage. Each of the measured values is shown by averaging n=30 specimens. The rating of the solid electrolytic capacitor is 6.3WV, 22 $\mu$F.

TABLE 3

|  | Initial values | | | After 1,000 hours | |
|---|---|---|---|---|---|
|  | C ($\mu$F) | ESR (m$\Omega$) | LC ($\mu$A) | ΔC (%) | ΔESR (%) |
| Example 31 | 22 | 25 | 78 | −1.5 | 5.5 |
| Example 32 | 24 | 28 | 78 | −1.1 | 5.3 |
| Comparative example 4 | 21 | 32 | 80 | −5.1 | 21 |

As shown in Table 3, the solid electrolytic capacitors in the example 31 and the example 32, containing carbon particles and pyrogallol or catechel in the carbon layer, have better initial characteristics than those in the comparative example 4. Further, the solid electrolytic capacitors in the present examples maintain excellent performance even after 1,000 hours of leaving at high temperatures. That is, in the present examples, the electrostatic capacity is 22–24 $\mu$F, ESR is 25–28 m$\Omega$, and leak current is 78 $\mu$A. Also, after 1,000 hours of leaving at 105° C., the capacity change rate (ΔC) is 1.1–1.5%, and ESR change rate is 5.3–5.5%. On the other hand, in the comparative example 4, the electrostatic capacity is 21 $\mu$F, ESR is 32 m$\Omega$ or less, and leak current is 80 $\mu$A. Furthermore, after 1,000 hours of leaving at 105° C., the capacity change rate (ΔC) is 5.1%, and ESR change rate is 21%.

Thus, the solid electrolytic capacitors in the present examples 31 and 32 have better initial characteristics than those in the comparative example. Further, the capacity change rate and ESR change rate after 1,000 hours of leaving at 105° C. are smaller than those in the comparative example. Particularly, with respect to the capacity change rate and ESR change rate after 1,000 hours of leaving at 105° C., the solid electrolytic capacitors in the present examples are smaller than those in the comparative example.

As described above, due to the configuration of the present invention, the carbon layer obtained is fine and uniform. Accordingly, the contact resistance between the solid electrolyte layer and the carbon layer is reduced, and the contact resistance between the carbon layer and the conductor layer is also reduced. As a result, it is possible to obtain a solid electrolytic capacitor assuring excellent equivalent series resistance (ESR characteristics) and capacity utilization factor.

What is claimed is:
1. A solid electrolytic capacitor, comprising:
   an positive electrode body;
   a dielectric layer formed on the surface of said positive electrode body;
   a solid electrolyte layer formed on the surface of said dielectric layer;
   a negative electrode layer disposed on the surface of said solid electrolyte layer;
   an positive electrode terminal electrically connected to said positive electrode body; and
   a negative electrode terminal electrically connected to said negative electrode layer, wherein said negative electrode layer includes a carbon layer, and said carbon layer contains carbon particles, and a benzene compound represented by chemical formula 1, where each of R1, R2, R3, and R4 has H, OH group, COOH group, or alkyl group.

Chemical formula 1

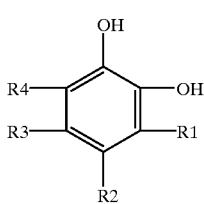

2. The solid electrolytic capacitor as defined in claim 1, wherein said positive electrode body includes valve metal, and said dielectric layer includes a dielectric oxide film formed by oxidation of said valve metal.

3. The solid electrolytic capacitor as defined in claim 1, wherein said negative electrode layer further includes a conductor layer,
said carbon layer is disposed on the surface of said dielectric layer, and
said conductor layer is disposed on the surface of said carbon layer.

4. The solid electrolytic capacitor as defined in claim 1, wherein said positive electrode body includes valve metal;
said dielectric layer includes a dielectric oxide film formed by oxidation of said valve metal;
said negative electrode layer further includes a conductor layer;
said carbon layer is disposed on the surface of said dielectric oxide film; and
said conductor layer is disposed on the surface of said carbon layer.

5. The solid electrolytic capacitor as defined in claim 1, further comprising facing resin,
wherein said facing resin is disposed so as to cover said positive electrode body, said solid electrolyte layer, and said negative electrode layer, in a state such that each of said positive electrode terminal and said negative electrode terminal is partially exposed from the facing resin.

6. The solid electrolytic capacitor as defined in claim 1, further comprising facing resin,
wherein said positive electrode body includes valve metal;
said dielectric layer includes a dielectric oxide film;
said negative electrode layer further includes a conductor layer;
said carbon layer is disposed on the surface of said dielectric oxide film;
said conductor layer is disposed on the surface of said carbon layer; and
in a state such that each of said positive electrode terminal and said negative electrode terminal is partially disposed, said facing resin is disposed so as to cover said positive electrode body, said solid electrolyte layer and said negative electrode layer.

7. The solid electrolyte capacitor as defined in claim 1, wherein said carbon layer contains one part by weight of said carbon particles and 0.1 part to 1.8 part by weight of said benzene compound.

8. The solid electrolytic capacitor as defined in claim 1, wherein said benzene compound contains at least one of catechol and pyrogallol.

9. The solid electrolytic capacitor as defined in claim 1, wherein said solid electrolyte layer contains manganese dioxide.

10. The solid electrolytic capacitor as defined in claim 1, wherein said solid electrolyte layer includes a conductive polymer formed of at least one heterocyclic monomer selected from the group consisting of pyrrole, thiophene, aniline, and 3, 4-ethylene dioxythiophene.

11. The solid electrolytic capacitor as defined in claim 1, wherein said positive electrode body is formed of at least one of (i) valve metal having a roughened surface and (ii) valve metal sintered into porous metal.

12. The solid electrolytic capacitor as defined in claim 1, wherein said positive electrode body includes aluminum having a roughened surface,
said dielectric layer includes a dielectric oxide film formed by surface oxidation of said aluminum.

13. A solid electrolytic capacitor, comprising:
an positive electrode body formed of valve metal;
a dielectric oxide film disposed on the surface of said positive electrode body;
a solid electrolyte layer disposed on the surface of said dielectric oxide film;
a negative electrode layer disposed on the surface of said solid electrolyte layer;
an positive electrode terminal electrically connected to said positive electrode body;
a negative electrode terminal electrically connected to said negative electrode layer; and
facing resin disposed in a state such that each of said positive electrode terminal and said negative electrode terminal is partially exposed,
wherein said negative electrode layer includes a carbon layer, and
said carbon layer contains carbon particles and a benzene compound represented by the chemical formula 1, where each of R1, R2, R3, and R4 and H, OH group, COOH group, or alkyl group Chemical formula 1

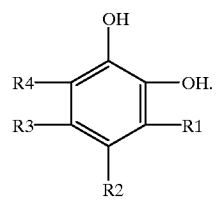

* * * * *